(12) United States Patent
Cao et al.

(10) Patent No.: US 11,209,867 B2
(45) Date of Patent: Dec. 28, 2021

(54) SUPPORTING STRUCTURE AND DISPLAY DEVICE

(71) Applicant: BOE TECHNOLOGY GROUP CO., LTD., Beijing (CN)

(72) Inventors: Fangxu Cao, Beijing (CN); Haoran Wang, Beijing (CN); Liming Dong, Beijing (CN); Yonghong Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/820,823

(22) Filed: Mar. 17, 2020

(65) Prior Publication Data

US 2021/0149448 A1 May 20, 2021

(30) Foreign Application Priority Data

Nov. 19, 2019 (CN) .......................... 201911136171.6

(51) Int. Cl.
*G06F 1/16* (2006.01)
*G09F 9/30* (2006.01)

(52) U.S. Cl.
CPC .......... *G06F 1/1652* (2013.01); *G06F 1/1601* (2013.01); *G09F 9/301* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,503,027 B2* | 12/2019 | Park | .................... | G02F 1/13394 |
| 10,656,473 B2* | 5/2020 | Bi | ........................ | G02F 1/13392 |
| 10,866,671 B2* | 12/2020 | Zhang | .................... | H05K 1/118 |
| 2016/0231843 A1 | 8/2016 | Kim et al. | | |
| 2018/0076236 A1* | 3/2018 | Kwon | ................. | H01L 27/1222 |
| 2018/0081219 A1* | 3/2018 | Kim | .................... | G02F 1/13338 |

(Continued)

FOREIGN PATENT DOCUMENTS

| | | |
|---|---|---|
| CN | 108268170 A | 7/2018 |
| CN | 208141720 U | 11/2018 |
| CN | 110010001 A | 7/2019 |

OTHER PUBLICATIONS

First Office Action for CN Patent Application No. 201911136171.6 dated Oct. 30, 2020.

*Primary Examiner* — Lisa Lea-Edmonds
(74) *Attorney, Agent, or Firm* — Thomas | Horstemeyer, LLP (57) ABSTRACT

This application relates to a supporting structure applied to a flexible display panel and a display device. The supporting structure includes: a bendable region having a plurality of first hollowed-out holes, a bendable axis corresponding to the bendable region extending in a first direction; and at least two fixed regions at opposite sides of the bendable region in a second direction intersecting with the first direction. The fixed region has a rigid holding portion and a buffer portion having a plurality of second hollowed-out holes. The buffer portion is connected to the bendable region, and rigidity of the buffer portion is greater than or equal to rigidity of the bendable region. At least part of the rigid holding portion is provided at a side of the buffer portion away from the bendable region, and rigidity of the rigid holding portion is greater than rigidity of the buffer portion.

20 Claims, 3 Drawing Sheets

(56) References Cited

U.S. PATENT DOCUMENTS

| | | | |
|---|---|---|---|
| 2018/0192527 A1* | 7/2018 | Yun | G09F 9/301 |
| 2018/0321708 A1* | 11/2018 | Wu | G06F 3/044 |
| 2019/0132947 A1* | 5/2019 | Koo | H05K 1/0281 |
| 2019/0196548 A1* | 6/2019 | Kim | G09F 9/301 |
| 2019/0200466 A1* | 6/2019 | Kim | G09F 9/301 |
| 2019/0243424 A1* | 8/2019 | Lee | G06F 1/1616 |
| 2020/0004296 A1* | 1/2020 | Lee | G06F 1/1652 |
| 2020/0026382 A1* | 1/2020 | Zhang | G06F 3/0412 |
| 2020/0135065 A1* | 4/2020 | Song | H05K 1/189 |
| 2020/0241594 A1* | 7/2020 | Cavallaro | H04M 1/0268 |
| 2020/0243780 A1* | 7/2020 | Dong | H01L 51/0097 |
| 2020/0265758 A1* | 8/2020 | Huang | G09F 9/301 |
| 2020/0273379 A1* | 8/2020 | Wang | G09F 9/301 |
| 2020/0313111 A1* | 10/2020 | Kim | H01L 51/529 |
| 2020/0409420 A1* | 12/2020 | Nakamura | G09G 3/035 |
| 2021/0109570 A1* | 4/2021 | Wu | G06F 3/0443 |

\* cited by examiner

SUPPORTING STRUCTURE AND DISPLAY DEVICE

CROSS-REFERENCE TO RELATED APPLICATION

This application is based on, and claims the benefit of and priority to, Chinese Patent Application No. 201911136171.6, filed on Nov. 19, 2019, the entire contents of which are incorporated herein by reference.

TECHNICAL FIELD

The present application relates to the field of display technologies and, in particular, relates to a supporting structure and a display device.

BACKGROUND

With the development of display technologies, flexible display panels that can be folded, stretched, curled, or the like are gradually increasing in the market. In order to facilitate for bending or restoration of the flexible display panels, it is necessary to make the flexible display panel thinner and lighter.

However, as the flexible display panels become thinner and lighter, the overall bending resistance and impact resistance are poorer, and reliability and stability of the products are reduced.

It should be noted that the information disclosed in the above "Background" section is only intended to enhance understanding of the background of the present disclosure, and thus may include information that does not constitute the prior art as already known by an ordinary person skilled in the art.

SUMMARY

An objective of the present disclosure is to provide a supporting structure and a display device, ensuring structural stability of the supporting structure and enhancing impact resistance and bending resistance of the flexible display panel.

The present disclosure provides a supporting structure applied to a flexible display panel. The supporting structure includes: a bendable region, wherein a bendable axis corresponding to the bendable region extends in a first direction, and the bendable region comprises a plurality of first hollowed-out holes; and at least two fixed regions, wherein the at least two fixed regions are at opposite sides of the bendable region in a second direction, and the second direction intersects with the first direction; wherein each of the at least two fixed region has a rigid holding portion and a buffer portion having a plurality of second hollowed-out holes; the buffer portion is connected with the bendable region, and rigidity of the buffer portion is greater than or equal to rigidity of the bendable region; at least a part of the rigid holding portion is provided at a side of the buffer portion away from the bendable region, and rigidity of the rigid holding portion is greater than the rigidity of the buffer portion.

In one or more exemplary embodiments of the present disclosure, the first hollowed-out holes are arranged at equal intervals, and the second hollowed-out holes are arranged at equal intervals.

In one or more exemplary embodiments of the present disclosure, a shape and an area of the first hollowed-out hole are the same as a shape and an area of the second hollowed-out hole. Also, intervals between adjacent first hollowed-out holes are equal to intervals between adjacent second hollowed-out holes.

In one or more exemplary embodiments of the present disclosure, an area of the first hollowed-out hole is larger than an area of the second hollowed-out hole; and/or intervals between the first hollowed-out holes adjacent to each other are smaller than intervals between the second hollowed-out holes adjacent to each other.

In one or more exemplary embodiments of the present disclosure, the rigid holding portion comprises a first rigid holding strip, a second rigid holding strip, and a third rigid holding strip sequentially connected, wherein the first rigid holding strip and the third rigid holding strip are respectively located at opposite sides of the buffer portion in the first direction and are in contact with the bendable region, and the second rigid holding strip is located at a side of the buffer portion away from the bendable region.

In one or more exemplary embodiments of the present disclosure, a width of the first rigid holding strip and a width of the second rigid holding strip gradually increase in a direction from the bendable region to the second rigid holding strip, where the width is a size in the first direction.

In one or more exemplary embodiments of the present disclosure, the bendable region is curlable, the bendable region having a plurality of curlable portions arranged in the second direction; where a rigidity of the curlable portion gradually increases in a direction from a curling head to a curling tail.

In one or more exemplary embodiments of the present disclosure, a size of the curlable portion in the second direction gradually increases in the direction from the curling head to the curling tail.

In one or more exemplary embodiments of the present disclosure, each of the curlable portions has a plurality of through holes, where the curlable portions at least includes a first curlable portion and a second curlable portion, and the first curlable portion is closer to the curling head than the second curlable portion; a ratio between a total area of the plurality of through holes in the first curlable portions and a total area of the first curlable portion is greater than a ratio between a total area of the plurality of through holes in the second curlable portions and a total area of the second curlable portion.

The present disclosure further provides a display device including a flexible display panel and the supporting structure according to any one of the above embodiments. The supporting structure is disposed at a side of the flexible display panel.

The present disclosure also provides a manufacturing method of a supporting structure, where the supporting structure has a bendable region and at least two fixed regions. The manufacturing method includes: performing a hollowing-out process on the bendable region to form a plurality of first hollowed-out holes, where a bendable axis corresponding to the bendable region extends in a first direction; providing the at least two fixed regions at two opposite sides of the bendable region in a second direction, where the second direction intersects with the first direction; providing a rigid holding portion and a buffer portion on each of the at least two fixed regions; and performing a hollowing-out process on the buffer portion to form a plurality of second hollowed-out holes, where the buffer portion is connected to the bendable region, and rigidity of the buffer portion is greater than or equal to rigidity of the bendable region; where at least a part of the rigid holding portion is provided at a side of the buffer portion away from the bendable region, and a rigidity of the rigid holding portion is greater than the rigidity of the buffer portion.

In one or more exemplary embodiments of the present disclosure, the first hollowed-out holes are arranged at equal intervals, and the second hollowed-out holes are arranged at equal intervals.

In one or more exemplary embodiments of the present disclosure, a shape and an area of the first hollowed-out hole are the same as a shape and an area of the second hollowed-out hole. Additionally, intervals between adjacent first hollowed-out holes are equal to intervals between adjacent second hollowed-out holes.

In one or more exemplary embodiments of the present disclosure, an area of the first hollowed-out hole is larger than an area of the second hollowed-out hole, and/or intervals between the first hollowed-out holes adjacent to each other are smaller than intervals between the second hollowed-out holes adjacent to each other.

In one or more exemplary embodiments of the present disclosure, the rigid holding portion includes a first rigid holding strip, a second rigid holding strip, and a third rigid holding strip sequentially connected, where the first rigid holding strip and the third rigid holding strip are respectively located at opposite sides of the buffer portion in the first direction and are in contact with the bendable region; and the second rigid holding strip is located at a side of the buffer portion away from the bendable region.

In one or more exemplary embodiments of the present disclosure, a width of the first rigid holding strip and a width of the second rigid holding strip gradually increase in a direction from the bendable region to the second rigid holding strip, where the width is a size in the first direction.

In one or more exemplary embodiments of the present disclosure, the bendable region is curlable, where the bendable region has a plurality of curlable portions arranged in the second direction; and a rigidity of the curlable portion gradually increases in a direction from a curling head to a curling tail.

In one or more exemplary embodiments of the present disclosure, a size of the curlable portion in the second direction gradually increases in the direction from the curling head to the curling tail.

In one or more exemplary embodiments of the present disclosure, each of the curlable portions has a plurality of through holes, where the curlable portions at least includes a first curlable portion and a second curlable portion, and the first curlable portion is closer to the curling head than the second curlable portion; a ratio between a total area of the plurality of through holes in the first curlable portions and a total area of the first curlable portion is greater than a ratio between a total area of the plurality of through holes in the second curlable portions and a total area of the second curlable portion.

The supporting structure provided by the present disclosure can be disposed at a side of a flexible display panel to provide a certain support for the flexible display panel, thereby improving flatness of the flexible display panel and enhancing impact resistance and bending resistance of the flexible display panel. The supporting structure may include a bendable region and fixed regions, and the rigidity of the fixed region is greater than the rigidity of the bendable region. This design can ensure the supporting structure capable of stably supporting the flexible display panel, and also facilitate bending of the supporting structure to match with a smaller bending radius. In addition, the fixed portion is divided into two portions with different rigidities, that is, a buffer portion and a rigid holding portion so that rigidity mutation at the junction between the fixed region and the bendable region can be reduced, and stability of the overall shape of the entire supporting structure can be ensured and the machining deformation can be reduced.

The display device as provided by the present application supports the flexible display panel via the supporting structure, which can improve reliability and stability of the products.

It should be understood that the above general description and the following detailed description are merely illustrative and explanatory, and thereby should not be construed as limiting the present disclosure.

BRIEF DESCRIPTION OF THE DRAWINGS

The accompanying drawings are incorporated in and constitute one part of the specification, show embodiments of the present disclosure and are intended to explain the principle of the present disclosure together with the description. Understandably, the drawings as described below are only exemplary, based on which the other drawings may be obtained by the person skilled in the art without any creative work.

DETAILED DESCRIPTION

Now, example embodiments will be described more fully with reference to the accompanying drawings. However, the example embodiments can be embodied in a variety of forms and should not be construed as limiting the embodiments set forth herein. Instead, these embodiments are provided so that the present disclosure will be thorough and complete, and the concepts of the exemplary embodiments will be fully conveyed to those skilled in the art. The same reference numerals denote the same or similar structures in the drawings, and thus their detailed descriptions will be omitted.

The relative words, such as "upper" and "lower", as used herein, are directed to describe a relative relationship between one component and another component of an icon. These words are used herein for convenience only, for example, according to the direction of the illustrative examples as shown in the figures. It should be understood that if the device is turned upside down, the component indicated as being the "upper" side would become the component on the "lower" side. When one structure is "on" another structure, it is possible to indicate that the structure is integrally formed on the other structure, or one structure is "directly" disposed on the other structure, or one structure is "indirectly" disposed on the other structure through a further structure.

The terms such as "a", "an", "the", and "said" are used to indicate the presence of one or more elements, components, etc. The terms "comprise", "include", "have", "contain", and their variants are intended to be inclusive, and mean there may be additional elements, components, etc., in addition to the listed elements, components, etc.

The present disclosure provides a supporting structure that can be applied to a flexible display panel. Specifically, the supporting structure can be disposed at a side of the flexible display panel to provide a certain support for the flexible display panel, such that flatness of the flexible display panel can be improved and impact resistance and bending resistance of the flexible display panel can be enhanced.

For example, the supporting structure may be disposed on a back surface of the flexible display panel, and the back surface refers to a surface arranged opposite to a display surface of the flexible display panel, but is not be limited thereto. The supporting structure may also be disposed at the display surface of the flexible display panel and, at this time, the supporting structure is required to be transparent to avoid affecting the normal display while providing support for the flexible display panel. In addition, when the supporting structure is disposed at the display surface of the flexible display panel, the supporting structure may also meet requirements of touch control.

It should be understood that, in order to satisfy supporting performance of the supporting structure, the supporting structure may be made of materials with a certain thickness and rigidity, for example, metal materials, and it should not be limited thereto.

Since the supporting structure has a certain thickness and rigidity, thereby leading to poorer bending performance, various disadvantages occur, such as providing a smaller bending radius and for dispersing stresses generated at bending, such that the structure of the flexible display panel is easily damaged under the action of the stress, and displaying performance decreases.

In order to improve these circumstances, the supporting structure may be designed to be divided into several regions. Specifically, the supporting structure may include a bendable region and fixed regions, where a bending axis corresponding to the bendable region extends in a first direction, and where the fixed regions are located at opposite sides of the bendable region in a second direction. It is worth noting that the second direction intersects with the first direction, that is to say, the fixed region does not affect bending or curling of the bendable region. Optionally, the second direction is orthogonal to the first direction.

It should be understood that the bendable region of the supporting structure needs to be opposite to the bendable region of the flexible display panel. When the bendable region of the flexible display panel is bended or curled, the bendable region of the supporting structure may also be bended or curled along with the bendable region of the flexible display panel. The fixed region of the supporting structure needs to be opposite to the fixed region of the flexible display panel. In the process of bending or curling the flexible display panel in which the supporting structure is installed, the fixed region is required to be fixed so as to bend and curl the bendable region, or to maintain the bending and curling state of the bendable region.

As described above, in order to improve bendability of the bendable region in the supporting structure, and thus facilitating for meet the requirement of a smaller bending radius, rigidity ("rigidity" refers to "ability of deformation resistance") of the bendable region needs to be designed to be smaller. Also, in order to ensure supporting stability of the supporting structure, ensure stability of the overall shape of the supporting structure, and reduce processing deformation, the rigidity of the fixed region needs to be designed to be larger, that is to say, the rigidity of the entire fixed region in the supporting structure should be greater than the rigidity of the bendable region.

In addition, it should be noted that, the entire supporting structure is generally made of the same metal material, that is to say, the material of the fixed region and the material of the bendable region in the supporting structure are the same, so that the fixed region and the bendable region may be differently patterned in order to enable the fixed region and the bendable region to have different rigidities.

In order to make the rigidity of the bendable region smaller than the rigidity of the fixed region, the entire bendable region may be patterned in an opening-hole manner, and the fixed region is not patterned. That is, in the formed supporting structure, the entire bendable region is opened with a plurality of first hollowed-out holes, and the fixed region does not have any hollowed-out holes. However, this solution can cause a difference in the rigidities between the fixed region and the bendable region to be too large, which may lead to a larger rigidity mutation (i.e., sudden change in rigidity) at the junction between the fixed region and the bendable region. Since the larger rigidity mutation occurs at the junction between the fixed region and the bendable region, the stress concentration will easily occurs at the junction between the fixed region and the bendable region during the bending or curling process, such that the supporting structure and the flexible display panel can be easily damaged.

Further, in order to eliminate or reduce occurrence of the rigidity mutation at the junction between the fixed region and the bendable region, the entire bendable region is patterned in an opening-hole manner, such that the entire bendable region is opened with a plurality of first hollowed-out holes while a part of structure of the fixed region connected to the bendable region may be patterned in the opening-hole manner to reduce the rigidity of the part of structure of the fixed region. The part of structure can be defined as a buffer portion, that is, the buffer portion may be opened with a plurality of second hollowed-out holes. The rigidity of the buffer portion may be slightly greater than or equal to the rigidity of the bendable region to eliminate or reduce rigidity mutation at the junction between the fixed region and the bendable region.

In addition, it should be noted that the fixed region is designed to include not only the buffer portion, but also a rigid holding portion in order to ensure the overall stability of the supporting structure and accuracy of the processing. At least a part of the rigid holding portion is provided at a side of the buffer portion away from the bendable region. The rigidity of the rigid holding portion is greater than the rigidity of the buffer portion, such that the overall rigidity of the fixed region is greater than the rigidity of the bendable region. In this way, stability of the supporting structure and stability of the overall shape of the supporting structure can be ensured and processing deformation can be reduced, while the bendability of the bendable region in the supporting structure can be improved to facilitate for meeting the requirement of the smaller bending radius.

It should be understood that the rigid holding portion may be a portion in the fixed region that has not been patterned, and it is not limited thereto. The rigid holding portion may also be patterned, as long as the rigidity of the rigid holding portion is greater than the rigidity of the buffer portion, the entire supporting structure can meet the above requirements.

The supporting structures of different embodiments of the present disclosure will be described in detail below with reference to the accompanying drawings.

Figure 1:
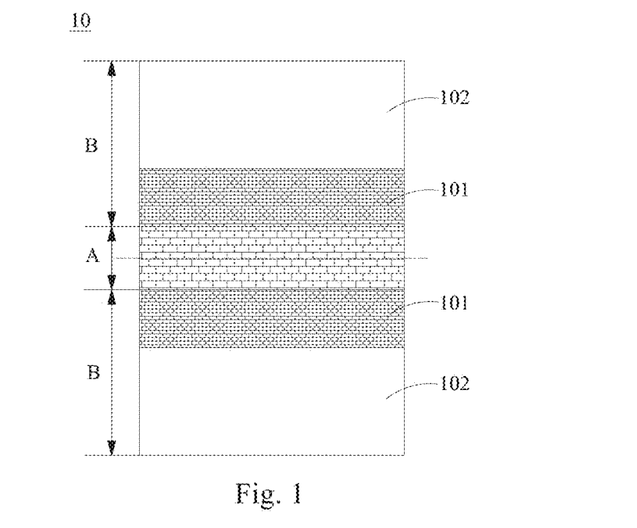
FIG. 1 is a schematic plan view of a supporting structure according to one or more embodiments of the present disclosure.

In one or more embodiments, for example, as shown in FIG. 1, first hollowed-out holes in the bendable region A of the supporting structure 10 are arranged at equal intervals to ensure that the bendable region A can evenly disperse stress during the bending process and avoid the circumstance that the bendable region A occurs damage. Similarly, second hollowed-out holes of the buffer portion 101 in the fixed region B of the supporting structure 10 are arranged at equal intervals to ensure that the buffer portion 101 can more evenly disperse stress during the bending process, and avoid the circumstance of the buffer portion 101 being damaged, such that the structural stability of the supporting structure 10 can be ensured.

The rigidity of the buffer portion 101 is slightly greater than the rigidity of the bendable region A. In this case, the supporting stability of the supporting structure 10 and the stability of the overall shape of the supporting structure 10 can be ensured, and processing deformation can be relieved while the rigidity mutation at a junction between the fixed region B and the bendable region A is eliminated or reduced.

It should be understood that the buffer portion 101 and the bendable region A can be differently patterned in order to enable the rigidity of the buffer portion 101 to be slightly larger than the rigidity of the bendable region A. In detail, when the buffer portion 101 and the bendable region A are patterned, an area of the first hollowed-out holes in the bendable region A may be larger than an area of the first hollowed-out holes in the buffer portion 101; and/or intervals between adjacent first hollowed-out holes are smaller than intervals between adjacent second hollowed-out holes, so that a ratio between a total area of the plurality of first hollowed-out holes and a total area of the bendable region A is greater than a ratio between a total area of the plurality of second hollowed-out holes and a total area of the buffer portion 101. Thus, the overall rigidity of the bendable region A is smaller than the overall rigidity of the buffer portion 101.

The rigid holding portion 102 of the fixed region B is located at a side of the buffer portion 101 away from the bendable region A. The rigid holding portion 102 is integrally rectangular and has not yet been patterned. In addition, the overall area of the rigid holding portion 102 is greater than the overall area of the buffer portion 101. In this case, the processing difficulty of the supporting structure 10 can be reduced while ensuring supporting stability of the supporting structure 10, ensuring stability of the overall shape of the supporting structure 10, and reducing processing deformation.

In one or more embodiments of the present disclosure, for example, the shape of the rigid holding portion 102 in the fixed region B, the positional relationship or the area ratio between the rigid holding portion 102 and the buffer portion 101, and the like may be different from that of the embodiment shown in FIG. 1. Other design concepts are the same as that of the embodiment shown in FIG. 1, for example, the pattern of the buffer portion 101, the pattern of the bendable region A, the rigid relationship between the buffer portion 101 and the bendable region A, and the like. However, it should be understood that other design concepts may be different from that of the embodiment shown in FIG. 1, as long as general design requirement of the present disclosure can be satisfied.

Figure 2:
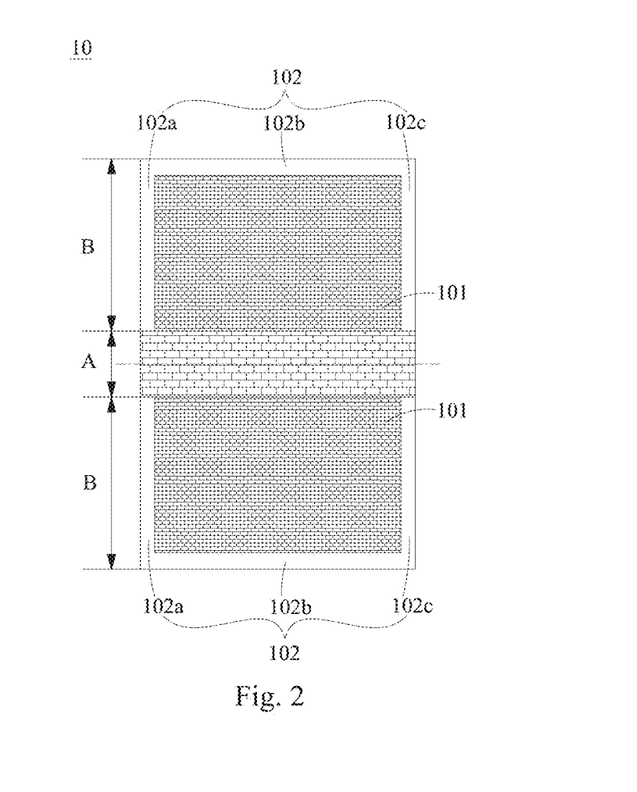
FIG. 2 is a schematic plan view of a supporting structure according to one or more embodiments of the present disclosure.

As shown in FIG. 2, the rigid holding portion 102 in the fixed region B has a U-shaped strip shape. The rigid holding portion 102 in the U-shaped strip is located at an edge of the fixed region B and surrounds the buffer portion 101. Specifically, the rigid holding portion 102 may include a first rigid holding strip 102a, a second rigid holding strip 102b, and a third rigid holding strip 102c sequentially connected. The first rigid holding strip 102a and the second rigid holding strip 102b are respectively located at the opposite sides of the buffer portion 101 in the first direction and connected with the bendable region A. The second rigid holding strip 102b is located at a side of the buffer portion 101 away from the bendable region A. The first rigid holding strip 102a, the second rigid holding strip 102b, and the third rigid holding strip 102c are rectangular strips, that is, the first rigid holding strip 102a has the same width throughout, the second rigid holding strip 102b has the same width throughout, and the third rigid holding strip 102c has the same width throughout.

The overall area of the rigid holding portion 102 is smaller than the overall area of the buffer portion 101 which can reduce rigidity mutation at the junction of the fixed region B and the bendable region A, and also reduce the weight of the supporting structure 10.

In one or more embodiments of the present disclosure, for example, the rigidity relationship between the buffer portion 101 and the bendable region A in the fixed region B may be different from that of the embodiment such as shown in FIG. 2. Also, other design concepts, for example, the pattern of the bendable region A, the shape of the rigid holding portion 102 in the fixed region B, the positional relationship or the area ratio between the rigid holding portion 102 and the buffer portion 101, and the like are the same as those of the embodiment shown in FIG. 2. However, it should be understood that other design concepts may be different from those of the embodiment shown in FIG. 2, as long as the general design requirements of the present disclosure can be satisfied.

Figure 3:
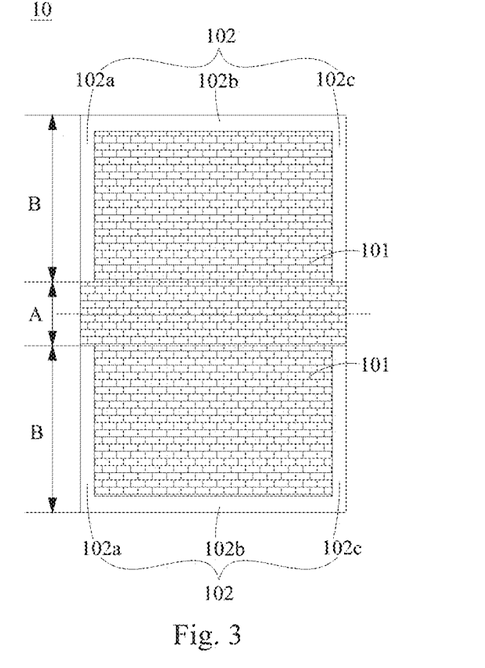
FIG. 3 is a schematic plan view of a supporting structure according to one or more embodiments of the present disclosure.

As shown in FIG. 3, the rigidity of the buffer portion 101 is equal to the rigidity of the bendable region A to substantially eliminate the rigidity mutation that occurs at the junction between the fixed region B and the bendable region A. It should be understood that, since the width of the first rigid holding strip 102a and the width the second rigid holding strip 102b are smaller, it is possible to disregard the mutation between the first rigid holding strip 102a, the second rigid holding strip 102b, and the bendable region A.

In order to enable the rigidity of the buffer portion 101 to be equal to the rigidity of the bendable region A, the same patterning process may be performed on the buffer portion 101 and the bendable region A. In detail, when the buffer portion 101 and the bendable region A are patterned, the shape and the area of the first hollowed-out hole may be the same as the shape and the area of the second hollowed-out hole, and the intervals between adjacent first hollowed-out holes may be the same as the intervals between adjacent second hollowed-out holes. In this way, the ratio between the total area of the plurality of first hollowed-out holes and the total area of the bendable region A is equal to the ratio between the total area of the plurality of second hollowed-out holes and the total area of the buffer portion 101, such that the rigidity of the entire bendable region A is equal to the rigidity of the entire buffer portion 101.

In addition, the same patterning process is performed on the buffer portion 101 and the bendable region A so that the processing difficulty of the supporting structure 10 can be reduced, while the rigidity mutation at the junction between the fixed region B and the bendable region A is substantially eliminated.

In one or more embodiments of the present disclosure, for example, the design concepts of the first rigid holding strip 102a and the third rigid holding strip 102c of the rigid holding portion 102 in the fixed region B may be different from the embodiment shown in FIG. 2; and other design concepts, for example, the positional relationship between the rigid holding portion 102 and the entire buffer portion 101, the rigidity relationship between the buffer portion 101 and the bendable region A, and the like are the same as those of the embodiment shown in FIG. 2. However, it should be understood that other design concepts may different from those of the embodiment shown in FIG. 2, as long as the general design requirements of the present disclosure can be satisfied.

Figure 4:
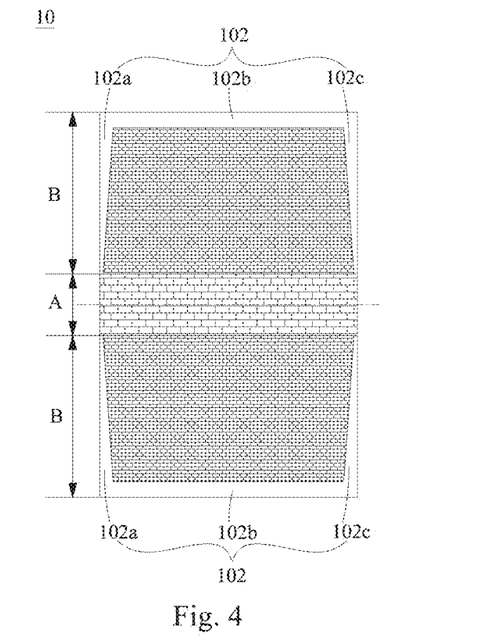
FIG. 4 is a schematic plan view of a supporting structure according to one or more embodiments of the present disclosure.

Generally, during the bending process, deformation of the portion of the supporting structure 10 close to the bending axis is greater than deformation of the portion away from the bending axis, thus the stress generated by the portion of the supporting structure 10 close to the bending axis is generally greater than the stress generated by the part away from the bending axis. Based on this, as shown in FIG. 4, when designing the first rigid holding strip 102a and the second rigid holding strip 102b, the width of the first rigid holding strip 102a and the width of the second rigid holding strip 102b may generally increase in a direction from the bendable region A to the second rigid holding strip 102b, so that the width of the buffer portion 101 gradually decreases in the direction along the bendable region A to the second rigid holding strip 102b. In the embodiment, the width at a side of the buffer portion 101 close to the bendable region A is designed to be larger, so that more stress can be released to avoid damage caused by excessive stress at this location; and the width at the sides of the first rigid holding strip 102a and the second rigid holding strip 102b away from the bendable region A is designed to be larger, so that the rigidity of the supporting structure 10 can be appropriately increased to ensure the supporting stability of the supporting structure 10 and the stability of the overall shape of the supporting structure 10 and reduce the processing deformation.

For example, the first rigid holding strip 102a and the third rigid holding strip 102c integrally may be presented in a stepped shape or a triangular shape, which is not limited thereto, and may be presented in other shapes.

In one or more embodiments of the present disclosure, the design concept of the bendable region A may be different from that of the above-mentioned embodiments, and other design concepts, for example, the design concept of the fixed region B may be the same as that of any of the above-mentioned embodiments, but it is not limited thereto. The fixed region B may also be designed in other forms, as long as the general design requirements of the present disclosure can be satisfied.

Figure 5:
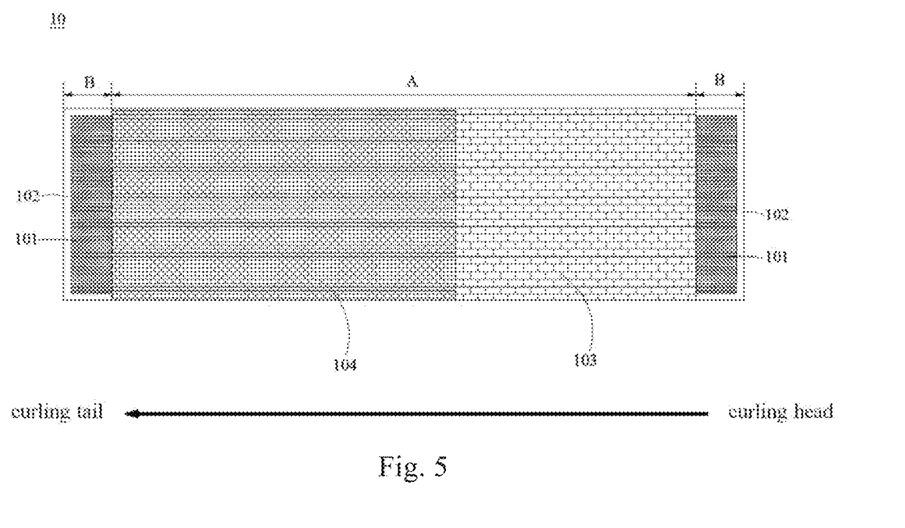
FIG. 5 is a schematic plan view of the supporting structure according to one or more embodiments of the present disclosure.

As shown in FIG. 5, the bendable region A can be curled. Specifically, during the curling process, the fixed region B at a side of the bendable region A may be fixed on the reel shaft firstly, the fixed region B at the other side of the bendable region A may be fixed on a pull-out mechanism, and then the bendable region A is curled. The rigidity of the fixed region B is designed to be greater than the rigidity of the bendable region A, in this case, this structure can be fixedly connected to the reel shaft and the pull-out mechanism, and the fixing stability between this structure and the reel shaft and the external pull mechanism can be ensured.

During the curling process, a curling radius gradually increases from an inner ring to an outer ring, so that the stress gradually decreases from the inner ring to the outer ring. Based on this, the bendable region A may be divided into regions. Specifically, the bendable region A has a plurality of curlable portions arranged in the second direction. The stress gradually decreases from the inner ring to the outer ring during the curling process, thus in the process of designing the bendable region A, the rigidity of each of curlable portions may gradually increase in a direction of a curling head to a curling tail, so that the bendable region A has a better curling performance, and the ability to ensure the bendable region A to recover from deformation can be increased to ensure less warping when being expanded, that is, the bendable region has a better flatness.

It should be understood that, during the curling process, the curling radius gradually increases from the inner ring to the outer ring. Thus, when designing the bendable region A, a size of each of curlable portions in the second direction gradually increases along the direction from the curling head to the curling tail to match with different curling radius.

In addition, in order to make the rigidity of each of the curlable portions in the bendable region A different, each curlable portion may be patterned in different opening-hole manner to adjust the rigidity of each of the curlable portions by changing a proportion of openings. In detail, each of the curlable portions has a plurality of through holes, where the plurality of curlable portions at least includes a first curlable portion 103 and a second curlable portion 104, and the first curlable portion 103 is closer to the curling head with respect to the second curlable portion 104. A ratio between a total area of the plurality of through holes of the first curlable portion 103 and a total area of the first curlable portion 103 is greater than a ratio between a total area of the plurality of through holes of the second curlable portion 104 and a total area of the second curlable portion 104. That is, a proportion of openings of the curlable portion close to the curling head is greater than a proportion of openings of the curlable portion away from the curling head, so that the rigidity of the curlable portion close to the curling head can be smaller than that of the curlable portion away from the curling head.

It should be understood that, in order to change the proportion of openings in each of the curlable portions, this can be achieved by adjusting the area of the through holes and/or adjusting the interval between adjacent through holes.

The present disclosure further provides a display device including a flexible display panel and the supporting structure 10 described in any of the foregoing embodiments. The supporting structure 10 may be disposed at a side of the flexible display panel; for the specific relationship between the supporting structure 10 and the flexible display panels, reference may be made to the content described in any of the foregoing embodiments, and details are not repeated herein. It should be noted that the bendable region A of the supporting structure 10 corresponds to the bendable region of the flexible display panel, and the fixed region B of the supporting structure 10 corresponds to the fixed region of the flexible display panel. During the process of curling or bending, the supporting structure 10 and the flexible display panel can be performed as a whole.

For example, the flexible display panel may be an OLED (Organic Light-Emitting Diode) display panel, but it is not limited thereto, and may also be a liquid crystal display panel.

The specific type of the display device is not particularly limited, and any type of display devices commonly used in the art, for example, mobile device such as liquid crystal displays, OLED displays, mobile phones, wearable devices such as watches, VR devices, etc. may be available. Those skilled in the art can make a corresponding selection according to specific use requirements of the display device, which will not be repeated herein.

It should be noted that, in addition to the flexible display panel and the supporting structure 10, the display device also includes other necessary components and parts, for example, a displayer, including a housing, a circuit board, and power cables. Those skilled in the art can make corresponding supplement according to the specific use requirements of the display device, which will not be repeated herein.

The present disclosure also provides a manufacturing method of a supporting structure 10, where the supporting structure 10 has a bendable region A and at least two fixed regions B. The manufacturing method includes: performing hollowing-out process on the bendable region A to form a plurality of first hollowed-out holes, where a bendable axis corresponding to the bendable region A extends in a first direction; providing the at least two fixed regions B at two opposite sides of the bendable region A in a second direction, where the second direction intersects with the first direction; providing a rigid holding portion 102 and a buffer portion 101 on each of the fixed regions B; and performing hollowing-out process on the buffer portion 101 to form a plurality of second hollowed-out holes, where the buffer portion 101 is connected to the bendable region A, and rigidity of the buffer portion 101 is greater than or equal to rigidity of the bendable region A. At least a part of the rigid holding portion 102 is provided at a side of the buffer portion 101 away from the bendable region A, and rigidity of the rigid holding portion 102 is greater than the rigidity of the buffer portion 101.

Other embodiments of the present disclosure will be apparent to those skilled in the art for consideration of the specification and practice of the disclosure herein, or the embodiments mentioned in this application can also be combined. The present disclosure is intended to cover any variations, uses, or adaptations of the present disclosure following the general principles thereof and including such departures from the present disclosure as come within known or customary practice in the art. The specification and embodiments are to be regarded as illustrative only, with a real scope and spirit of the present disclosure being indicated by following appended claims.

What is claimed is:

1. A supporting structure applied to a flexible display panel, the supporting structure comprising:
   a bendable region, wherein a bendable axis corresponding to the bendable region extends in a first direction, the bendable region comprises a plurality of first hollowed-out holes, and the bendable region is curlable; and
   at least two fixed regions, wherein the at least two fixed regions are at opposite sides of the bendable region in a second direction and the second direction intersects with the first direction, wherein:
   each of the at least two fixed regions has a rigid holding portion and a buffer portion, the buffer portion has a plurality of second hollowed-out holes;
   the buffer portion is connected to the bendable region, and a rigidity of the buffer portion is greater than or equal to rigidity of the bendable region;
   at least a part of the rigid holding portion is provided at a side of the buffer portion away from the bendable region, and rigidity of the rigid holding portion is greater than the rigidity of the buffer portion;
   the bendable region has a plurality of curlable portions arranged in the second direction; and
   a rigidity of the curlable portions gradually increases in a direction from a curling head to a curling tail.

2. The supporting structure of claim 1, wherein:
   the first hollowed-out holes are arranged at equal intervals; and
   the second hollowed-out holes are arranged at equal intervals.

3. The supporting structure of claim 2, wherein a shape and an area of the first hollowed-out hole are the same as a shape and an area of the second hollowed-out hole, and intervals between the first hollowed-out holes adjacent to each other are equal to intervals between the second hollowed-out holes adjacent to each other.

4. The supporting structure of claim 2, wherein:
   an area of the first hollowed-out hole is larger than an area of the second hollowed-out hole; or
   intervals between the first hollowed-out holes adjacent to each other are smaller than intervals between the second hollowed-out holes adjacent to each other.

5. The supporting structure of claim 1, wherein:
   the rigid holding portion comprises a first rigid holding strip, a second rigid holding strip, and a third rigid holding strip sequentially connected;
   the first rigid holding strip and the third rigid holding strip are respectively located at opposite sides of the buffer portion in the first direction and are in contact with the bendable region; and
   the second rigid holding strip is located at a side of the buffer portion away from the bendable region.

6. The supporting structure of claim 5, wherein a width of the first rigid holding strip and a width of the second rigid holding strip gradually increase in a direction from the bendable region to the second rigid holding strip, the width being a size in the first direction.

7. The supporting structure of claim 1, wherein a size of the curlable portions in the second direction gradually increases in the direction from the curling head to the curling tail.

8. The supporting structure of claim 7, wherein:
   each of the curlable portions has a plurality of through holes;
   the curlable portions at least comprise a first curlable portion and a second curlable portion, and the first curlable portion is closer to the curling head than the second curlable portion; and
   a ratio between a total area of the plurality of through holes in the first curlable portion and a total area of the first curlable portion is greater than a ratio between a total area of the plurality of through holes in the second curlable portion and a total area of the second curlable portion.

9. The supporting structure of claim 1, wherein the supporting structure is implemented in a display device comprising a flexible display panel, the supporting structure being disposed at a side of the flexible display panel.

10. A manufacturing method of a supporting structure having a bendable region and at least two fixed regions, the manufacturing method comprising:
    performing a hollowing-out process on the bendable region to form a plurality of first hollowed-out holes, wherein a bendable axis corresponding to the bendable region extends in a first direction, and the bendable region is curlable;
    providing the at least two fixed regions at two opposite sides of the bendable region in a second direction, wherein the second direction intersects with the first direction, the bendable region has a plurality of curlable portions arranged in the second direction, and a rigidity of the curlable portion gradually increases in a direction from a curling head to a curling tail;

providing a rigid holding portion and a buffer portion on each of the at least two fixed regions; and performing a hollowing-out process on the buffer portion to form a plurality of second hollowed-out holes, wherein the buffer portion is connected to the bendable region, and a rigidity of the buffer portion is greater than or equal to a rigidity of the bendable region, wherein at least a part of the rigid holding portion is provided at a side of the buffer portion away from the bendable region, and a rigidity of the rigid holding portion is greater than the rigidity of the buffer portion.

11. The manufacturing method of the supporting structure of claim 10, wherein:
the first hollowed-out holes are arranged at equal intervals; and
the second hollowed-out holes are arranged at equal intervals.

12. The manufacturing method of the supporting structure of claim 11, wherein a shape and an area of the first hollowed-out hole are the same as a shape and an area of the second hollowed-out hole, and intervals between the first hollowed-out holes adjacent to each other are equal to intervals between the second hollowed-out holes adjacent to each other.

13. The manufacturing method of the supporting structure of claim 11, wherein:
an area of the first hollowed-out hole is larger than an area of the second hollowed-out hole; or
intervals between the first hollowed-out holes adjacent to each other are smaller than intervals between the second hollowed-out holes adjacent to each other.

14. The manufacturing method of the supporting structure of claim 10, wherein:
the rigid holding portion comprises a first rigid holding strip, a second rigid holding strip, and a third rigid holding strip sequentially connected;
the first rigid holding strip and the third rigid holding strip are respectively located at opposite sides of the buffer portion in the first direction and are in contact with the bendable region; and
the second rigid holding strip is located at a side of the buffer portion away from the bendable region.

15. The manufacturing method of the supporting structure of claim 14, wherein:
a width of the first rigid holding strip and a width of the second rigid holding strip gradually increase in a direction from the bendable region to the second rigid holding strip; and
the width is a size in the first direction.

16. The manufacturing method of the supporting structure of claim 10, wherein a size of the curlable portions in the second direction gradually increases in the direction from the curling head to the curling tail.

17. The manufacturing method of the supporting structure of claim 16, wherein:
each of the curlable portions has a plurality of through holes;
the curlable portions at least comprise a first curlable portion and a second curlable portion, and the first curlable portion is closer to the curling head than the second curlable portion; and
a ratio between a total area of the plurality of through holes in the first curlable portion and a total area of the first curlable portion is greater than a ratio between a total area of the plurality of through holes in the second curlable portion and a total area of the second curlable portion.

18. A system, comprising:
a supporting structure configured to be applied to a flexible display panel, comprising:
a bendable region, wherein a bendable axis corresponding to the bendable region extends in a first direction, and the bendable region comprises a plurality of first hollowed-out holes; and
at least two fixed regions, wherein the at least two fixed regions are at opposite sides of the bendable region in a second direction and the second direction intersects with the first direction, wherein:
each of the at least two fixed regions has a rigid holding portion and a buffer portion, the buffer portion has a plurality of second hollowed-out holes;
the buffer portion is connected to the bendable region, and a rigidity of the buffer portion is greater than or equal to rigidity of the bendable region;
at least a part of the rigid holding portion is provided at a side of the buffer portion away from the bendable region, and a rigidity of the rigid holding portion is greater than the rigidity of the buffer portion
the rigid holding portion comprises a first rigid holding strip, a second rigid holding strip, and a third rigid holding strip sequentially connected;
the first rigid holding strip and the third rigid holding strip are respectively located at opposite sides of the buffer portion in the first direction and are in contact with the bendable region; and
the second rigid holding strip is located at a side of the buffer portion away from the bendable region.

19. The system of claim 18, wherein a width of the first rigid holding strip and a width of the second rigid holding strip gradually increase in a direction from the bendable region to the second rigid holding strip, the width being a size in the first direction.

20. The system of claim 18, wherein the system further comprises the flexible display panel.

* * * * *